(12) United States Patent
Hennessy et al.

(10) Patent No.: US 9,755,392 B2
(45) Date of Patent: Sep. 5, 2017

(54) APPARATUS FOR SEATING WIRE CLAMP TO TERMINAL OF VEHICLE BATTERY

(71) Applicant: HONDA MOTOR CO., LTD., Tokyo (JP)

(72) Inventors: John David Hennessy, Duntroon (CA); Michael Joseph Maure, Barrie (CA); David Patrick Tracey, Shanty Bay (CA)

(73) Assignee: Honda Motor Co., Ltd., Tokyo (JP)

( * ) Notice: Subject to any disclaimer, the term of this patent is extended or adjusted under 35 U.S.C. 154(b) by 542 days.

(21) Appl. No.: 14/185,596

(22) Filed: Feb. 20, 2014

(65) Prior Publication Data

US 2015/0000122 A1    Jan. 1, 2015

(30) Foreign Application Priority Data

Jun. 27, 2013   (CA) ...................... 2819814

(51) Int. Cl.
*H01R 43/00* (2006.01)
*H01R 43/26* (2006.01)

(52) U.S. Cl.
CPC ......... *H01R 43/26* (2013.01); *H01M 2220/20* (2013.01); *Y10T 29/49117* (2015.01); *Y10T 29/53209* (2015.01)

(58) Field of Classification Search
CPC ............... H01R 43/26; H01M 2220/20; Y10T 29/53209; Y10T 29/49117
USPC .......... 29/825, 747; 439/761, 773, 764, 762, 439/769, 774, 759
See application file for complete search history.

(56) References Cited

U.S. PATENT DOCUMENTS

| | | |
|---|---|---|
| 3,678,450 A * | 7/1972 | Azamber ................. H01R 4/52 24/136 R |
| 4,445,358 A | 5/1984 | Gooding |
| 5,302,142 A | 4/1994 | Tabata |
| 5,346,407 A | 9/1994 | Hood |
| 5,492,780 A | 2/1996 | Okada |
| 5,851,129 A | 12/1998 | Matsunaga et al. |
| 6,857,914 B1 | 2/2005 | Spaulding et al. |
| 7,021,101 B2 | 4/2006 | Spiegelberg |
| 7,642,786 B2 * | 1/2010 | Philbrook .......... G01R 31/3627 324/426 |

* cited by examiner

*Primary Examiner* — Peter DungBa Vo
*Assistant Examiner* — Azm Parvez
(74) *Attorney, Agent, or Firm* — Standley Law Group LLP

(57) ABSTRACT

An apparatus, which includes a fixture assembly configured to operatively convey, at least in part, a seating force to a wire clamp received by a battery terminal of a vehicle battery in such a way that the wire clamp becomes and remains operatively seated relative to the battery terminal during operative installation of the wire clamp relative to the battery terminal, as well as a method for doing the same.

1 Claim, 8 Drawing Sheets

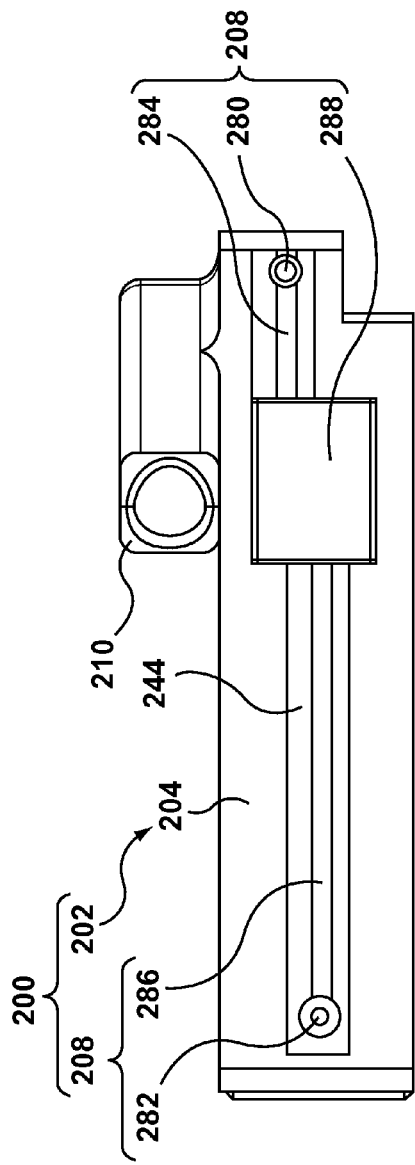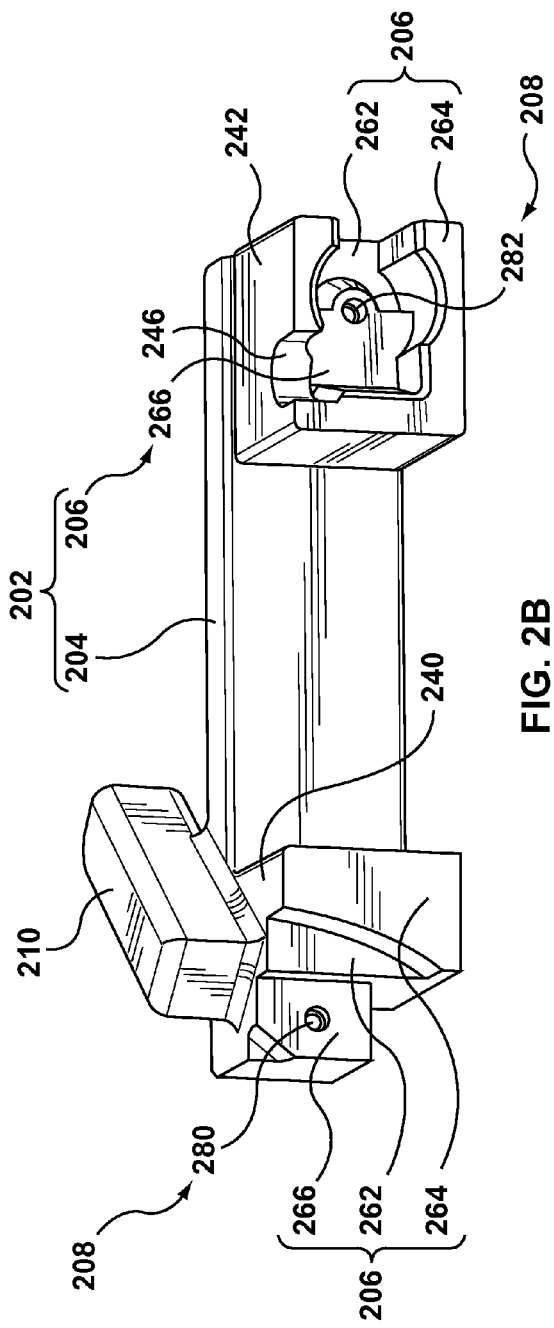

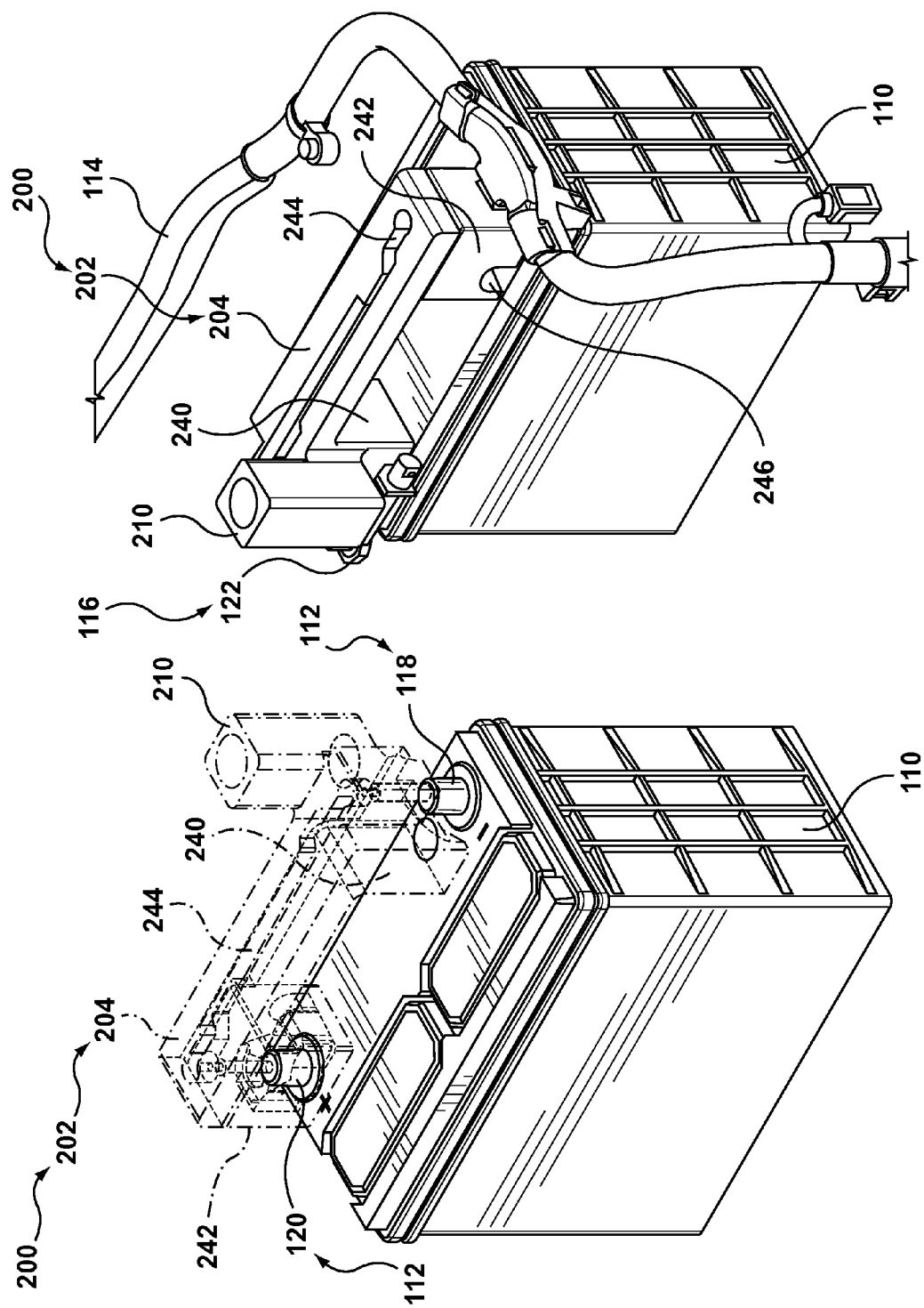

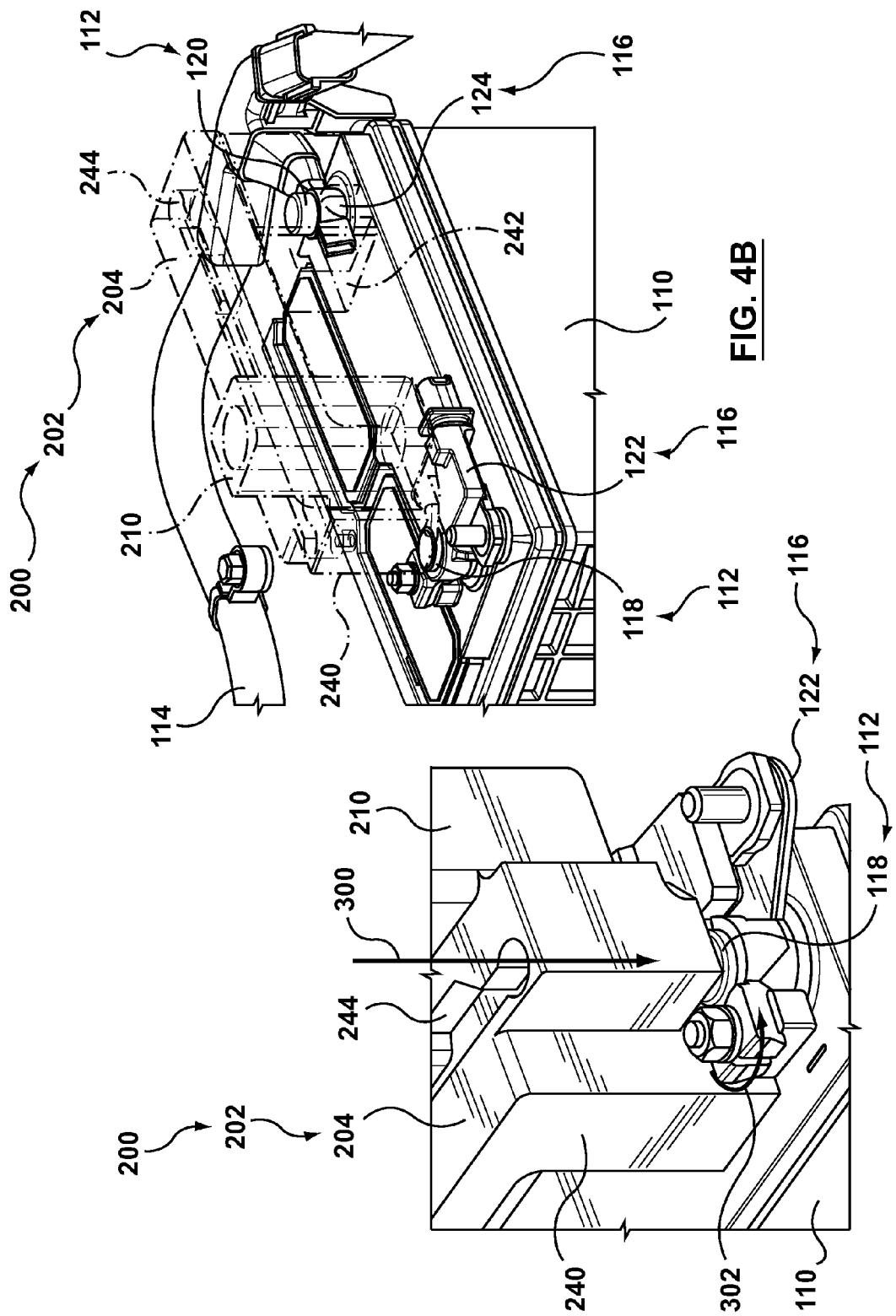

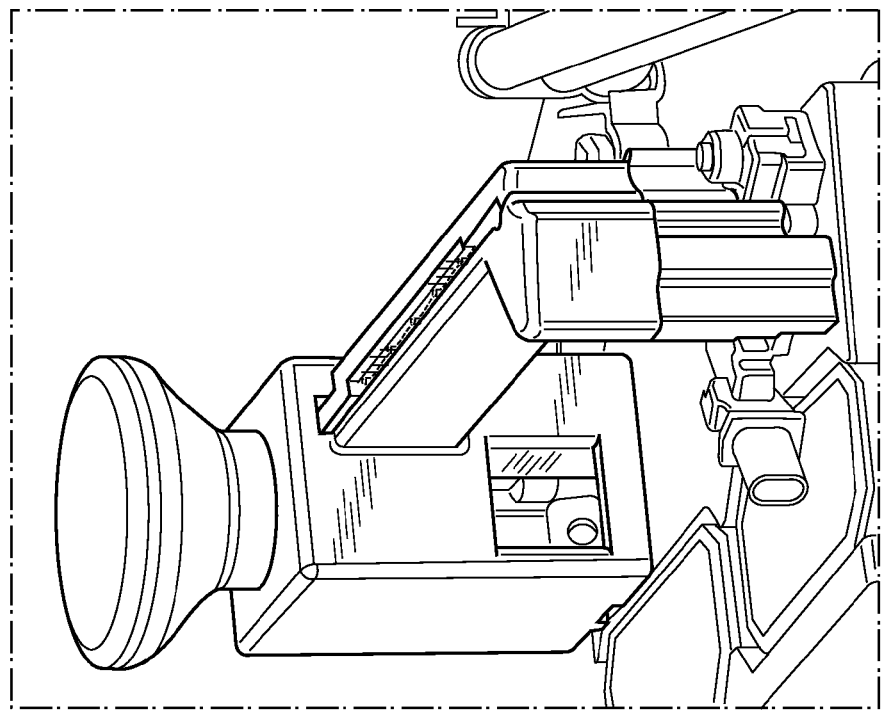
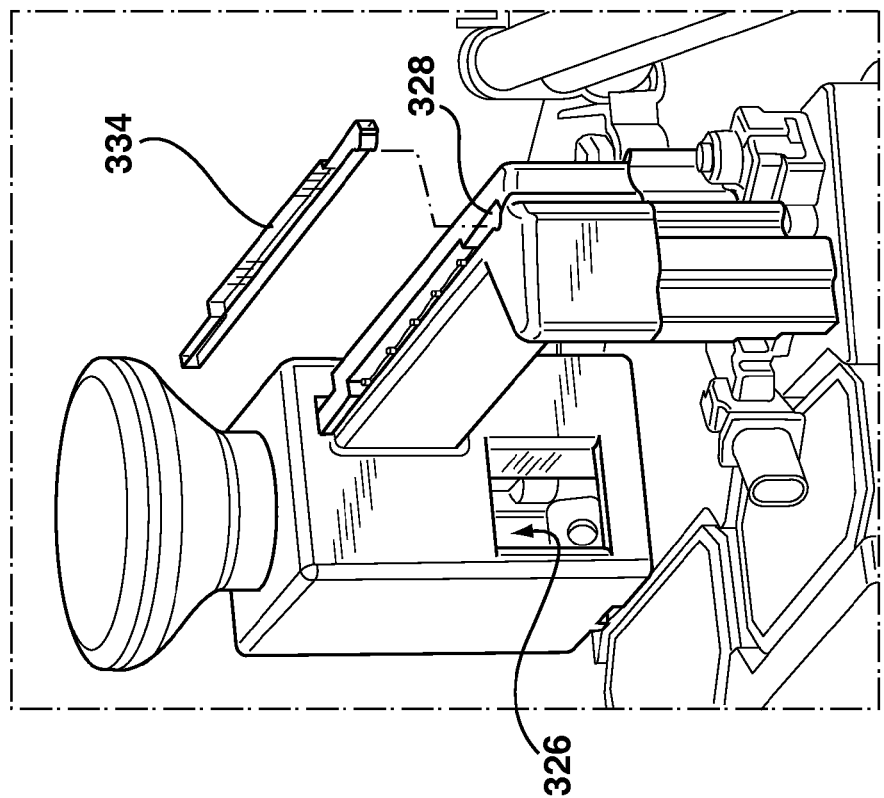

APPARATUS FOR SEATING WIRE CLAMP TO TERMINAL OF VEHICLE BATTERY

CROSS-REFERENCE TO RELATED APPLICATIONS

As authorized by 35 U.S.C. §119, this application claims priority to and hereby incorporates by reference Canadian Application Serial No. 2,819,814, titled APPARATUS FOR SEATING WIRE CLAMP TO TERMINAL OF VEHICLE BATTERY, filed Jun. 27, 2013.

FIELD OF THE DISCLOSURE

Aspects generally relate to (but are not limited to) an apparatus configured to seat a wire clamp to a battery terminal of a vehicle battery, and to a method of doing the same.

BACKGROUND

Battery terminals are electrical contacts configured to connect a load or a charger to a single cell or multiple-cell battery. The battery terminal may have a wide variety of designs, sizes, and features. There are several types of battery terminals used in a vehicle battery. One type is the SAE post. SAE is an acronym for the Society of Automotive Engineers. The SAE post includes two spaced apart posts (battery terminals) shaped as truncated cones, and each positioned on a top side of the vehicle battery, sometimes with slightly different diameters to ensure correct electrical polarity. Another type is the JIS post. JIS is an acronym for Japan Industrial Standard. The JIS post is similar to the SAE post but smaller, and the positive battery terminal is larger than negative battery terminal, but both are smaller than their SAE counterparts. Some vehicle manufacturers use side-post battery terminals, which include two recessed female threads into which bolts or various battery terminal adapters are to be attached. These side posts are about the same size and do not prevent incorrect polarity connections. L-terminals include an L-shaped post with a bolt hole through a vertical side, and are used on some European cars, motorcycles, lawn and garden devices, snowmobiles, and other light-duty vehicles.

SUMMARY

The inventors of the subject matter of this application have researched a problem associated with known vehicle batteries. After much study, it is believed that an understanding of the problem has been achieved and a solution to the problem has been realized, both of which are described below.

During installation of the known vehicle battery (for connection to the wiring system of the vehicle), wire clamps are used to connect the wiring system to the battery terminals of the known vehicle battery. Sometimes, the wire clamps are known to fail (inadvertently) to function as a clamp. It has been observed that the reason for this failure is improper installation (seating) of the wire clamps at the time the vehicle battery is installed (connected) to the wiring circuit of the vehicle, the result being that the vehicle battery may not properly operate.

In order to mitigate, at least in part, the problems identified above, in accordance with an aspect of our work, we (the inventors) have developed an apparatus, including a fixture assembly. The fixture assembly is configured to operatively seat a wire clamp to a battery terminal of a vehicle battery before and while the wire clamp is attached to the wire, so that the wire clamp remains operatively seated during installation of the wire clamp to the battery terminal.

In order to mitigate, at least in part, the problems identified above, in accordance with another aspect of our work, we (the inventors) have developed an apparatus for use with a vehicle battery having a battery terminal configured to be fixedly attached to a battery wire structure by a wire clamp. The wire clamp is configured to be operatively received by the battery terminal, and is also configured to operatively couple to the battery wire structure. The apparatus includes a fixture assembly configured to operatively convey, at least in part, a seating force to the wire clamp that is received by the battery terminal. The fixture assembly is also configured to operatively seat the wire clamp relative to the battery terminal. In this manner, in response to continued conveyance of the seating force to the wire clamp while a clamping force is applied to the wire clamp, the wire clamp operatively clamps the battery wire structure to the battery terminal, and the wire clamp is operatively seated relative to the battery terminal.

In order to mitigate, at least in part, the problems identified above, in accordance with another aspect of our work, we (the inventors) have developed a method of fixedly attaching a battery wire structure to a battery terminal using a wire clamp. The method includes operatively seating a wire clamp to a battery terminal of a vehicle battery before and while the wire clamp is attached to the wire, so that the wire clamp remains operatively seated during installation of the wire clamp to the battery terminal.

In order to mitigate, at least in part, the problems identified above, in accordance with another aspect of our work, we (the inventors) have developed a method of fixedly attaching a battery wire structure to a battery terminal using a wire clamp. The wire clamp is configured to be operatively received by the battery terminal, and is also configured to operatively couple to the battery wire structure. The method comprising operatively conveying, at least in part, a seating force to the wire clamp that is received by the battery terminal. The method also includes operatively seating the wire clamp relative to the battery terminal. In this manner, in response to continued conveyance of the seating force to the wire clamp while a clamping force is applied to the wire clamp, the wire clamp operatively clamps the battery wire structure to the battery terminal, and the wire clamp is operatively seated relative to the battery terminal.

In order to mitigate, at least in part, the problems identified above, in accordance with another aspect of our work, we (the inventors) have developed a method including operatively conveying, at least in part, a seating force to a wire clamp being received by a battery terminal of a vehicle battery in such a way that the wire clamp becomes and remains operatively seated relative to the battery terminal during operative installation of the wire clamp relative to the battery terminal.

In order to mitigate, at least in part, the problems identified above, in accordance with other aspects of our work, we (the inventors) have developed and provided other aspects as recited in the claims.

Other aspects and features of the non-limiting embodiments may now become apparent to those skilled in the art upon review of the following detailed description of the non-limiting embodiments with the accompanying drawings.

BRIEF DESCRIPTION OF THE DRAWING FIGURES

The non-limiting embodiments may be more fully appreciated by reference to the following detailed description of the non-limiting exemplary embodiments when taken in conjunction with the accompanying drawings, wherein like reference numerals across the several views refer to identical or equivalent features, and in which:

FIGS. 2A and 2B depict a top perspective view and a bottom perspective view, respectively, of examples of the apparatus of FIGS. 1A and 1B;

FIGS. 3A and 3B depict side perspective views of examples of the apparatus of FIGS. 1A and 1B;

FIGS. 4A and 4B depict side perspective views of examples of the apparatus of FIGS. 1A and 1B; and FIGS. 5, 6A and 6B, 7 and 8 depict perspective views of another example of the apparatus.

Figure 1B:
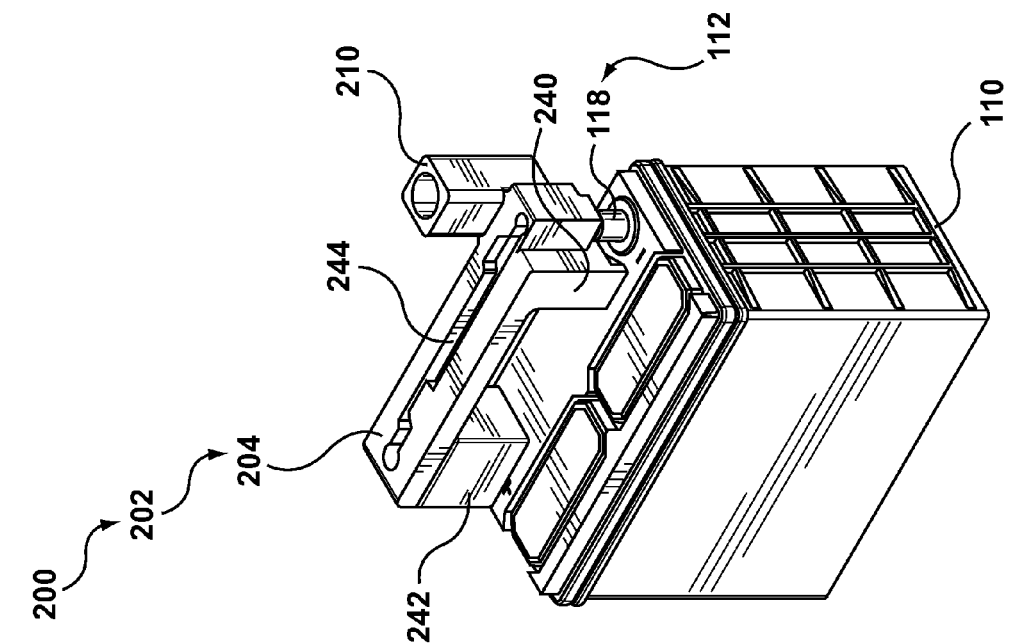
FIGS. 1A and 1B depict side perspective views of examples of an apparatus.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION OF THE EXEMPLARY EMBODIMENTS

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the examples as oriented in the drawings. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments (examples), aspects and/or concepts defined in the appended claims. Hence, specific dimensions and other physical characteristics relating to the embodiments disclosed herein are not to be considered as limiting, unless the claims expressly state otherwise.

Figure 1A:
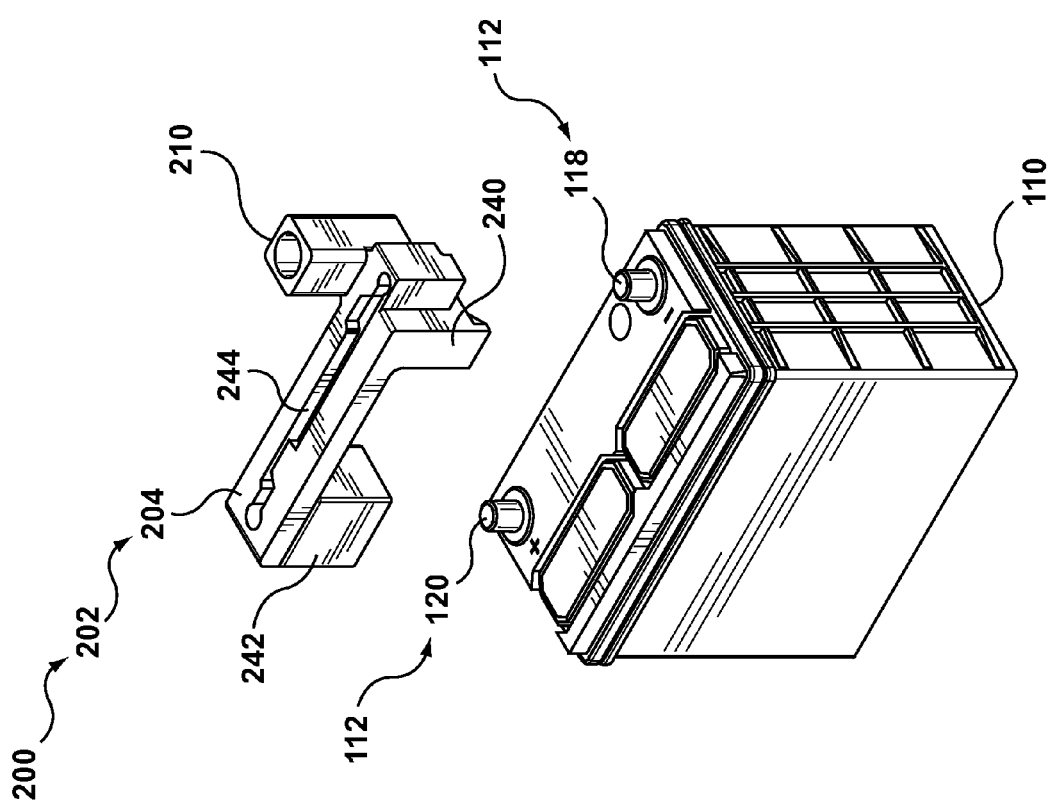
Figure 5:
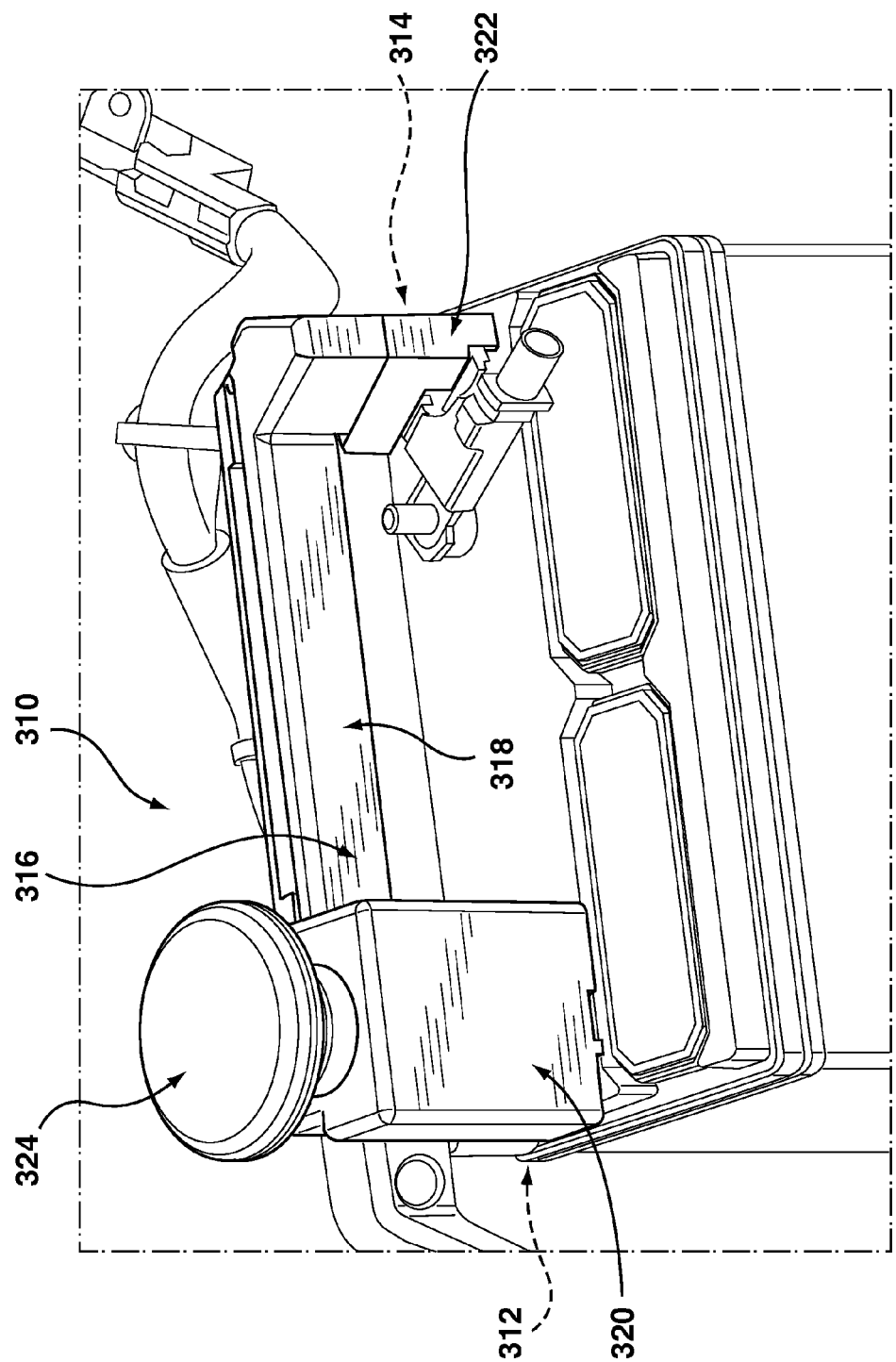
Figure 7:
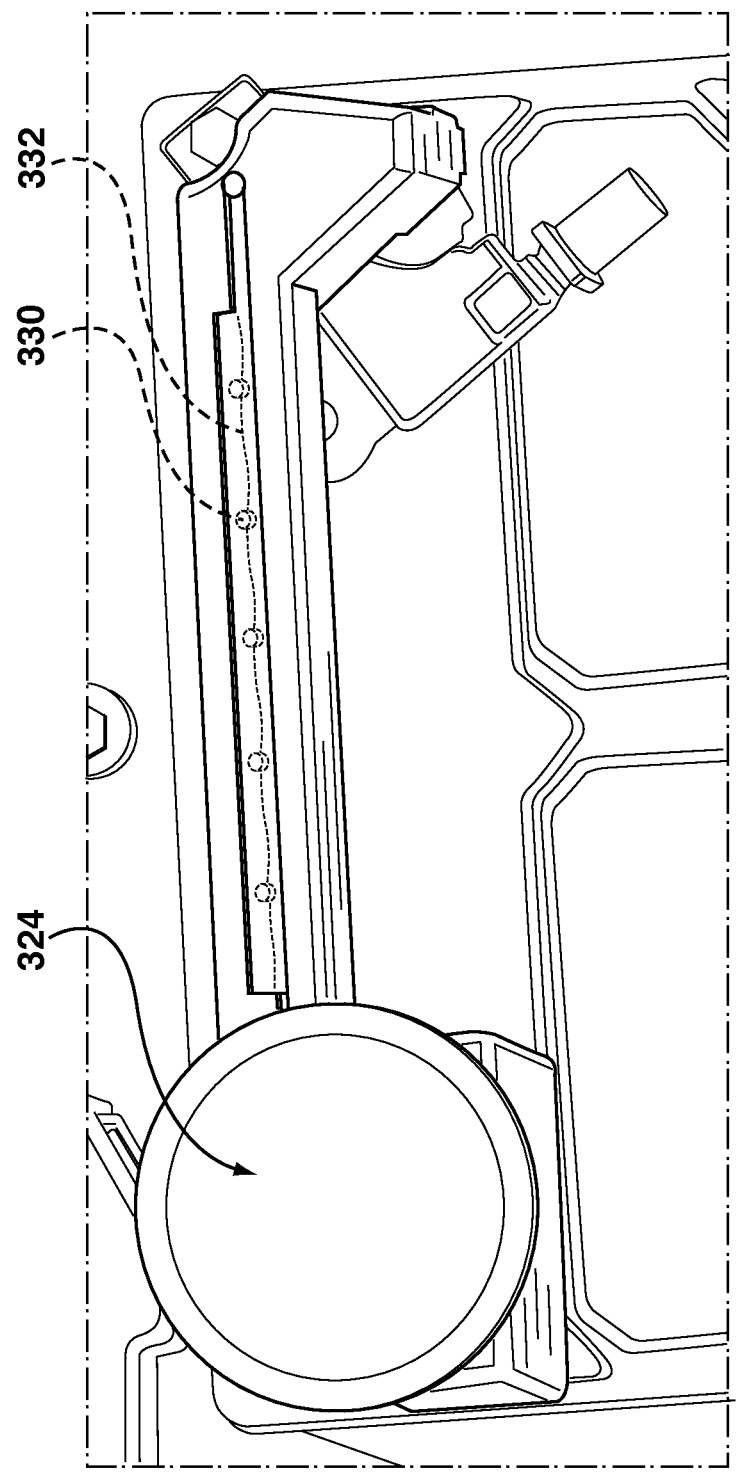
Figure 8:
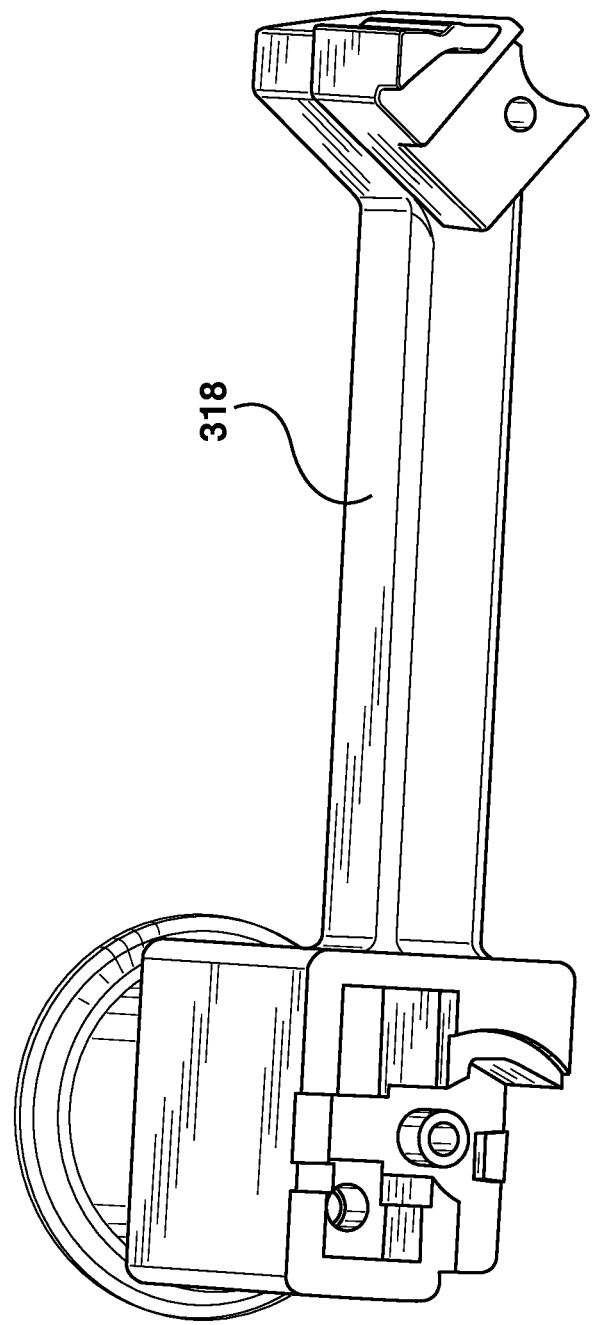

FIGS. 1A and 1B depict the side perspective views of the examples of an apparatus 200. The apparatus 200 is for use with a vehicle battery 110. FIG. 1A depicts the apparatus 200 spaced apart from the vehicle battery 110. FIG. 1B depicts the apparatus 200 placed adjacently to (in abutting relationship with) the vehicle battery 110. For example, a user or an operator may manually position the apparatus 200 relative to the vehicle battery 110, or an automated system may be configured to automatically position the apparatus 200 relative to the vehicle battery 110.

The vehicle battery 110 has at least one instance of a battery terminal 112. The battery terminal 112 extends from the vehicle battery 110 (extends from an outer surface of the vehicle battery 110). There are two instances of the battery terminal 112 per vehicle battery 110. For example, the instances of the battery terminal 112 may extend from the top surface of the vehicle battery 110 or extend from the opposite sides of the vehicle battery 110. By way of example, the battery terminal 112 includes a first battery terminal 118 extending from the vehicle battery 110. The battery terminal 112 also includes a second battery terminal 120 extending from the vehicle battery 110. The second battery terminal 120 is set apart from the first battery terminal 118. The first battery terminal 118 is the negative terminal. The second battery terminal 120 is the positive terminal. The battery terminal 112 is configured to be fixedly attached to a battery wire structure 114 by a wire clamp 116. An example of the battery wire structure 114 is depicted in FIGS. 3B and 4B. An example of the wire clamp 116 is depicted in FIGS. 3B, 3A and 4B.

Referring to FIGS. 3B, 4A and 4B, there is depicted the wire clamp 116 configured to be operatively received by the battery terminal 112. The definition of "operatively" means "in a manner to produce an effect." The wire clamp 116 defines a passageway extending through the wire clamp 116, and the passageway is configured to slidably receive the battery terminal 112. The wire clamp 116 is also configured to operatively couple to the battery wire structure 114. By way of example, the wire clamp 116 includes a first wire clamp 122 configured to be received by the first battery terminal 118. The wire clamp 116 also includes a second wire clamp 124 configured to be received by the second battery terminal 120.

Referring to FIGS. 1A and 1B, various options are depicted, in which the apparatus 200 includes a fixture assembly 202, a force-conveyance assembly 204, a seating assembly 206, and/or an auxiliary assembly 210. An example of the seating assembly 206 is depicted in FIG. 2B.

The force-conveyance assembly 204 includes a first extension 240 and also includes second extension 242. The first extension 240 extends toward the vehicle battery 110. The second extension 242 also extends toward the vehicle battery 110. The second extension 242 is spaced apart from the first extension 240. More specifically, the first extension 240 extends toward the first battery terminal 118. The second extension 242 extends toward the second battery terminal 120. It will be appreciated that the force-conveyance assembly 204 may include any one of the first extension 240 and/or the second extension 242 (or both if so desired); that is, as many instances of the first extension 240 may be deployed as there are instances of the battery terminal 112. For the case (not depicted) where the vehicle battery 110 includes side mounted battery terminals, the apparatus 200 may include one instance of the first extension 240 for use with the side-mounted battery terminal. Alternatively, a single extension may be configured for use with more than one instance of the battery terminal 112 (if so desired).

According to an option, the auxiliary assembly 210 is configured to extend from the force-conveyance assembly 204. The auxiliary assembly 210 is also configured to accommodate an auxiliary function associated with the apparatus 200. By way of example, the auxiliary assembly 210 includes a battery-grease holder configured to receive and hold battery grease to be applied to the battery terminal 112 (if so desired).

FIGS. 2A and 2B depict a top perspective view and a bottom perspective view, respectively, of examples of the apparatus 200 of FIGS. 1A and 1B. Referring to FIG. 2A, in accordance with an option, the apparatus 200 further includes an annunciation assembly 208. The annunciation assembly 208 may be configured to operatively couple to the instances of the battery terminal 112 once positioned to do just so, so that the vehicle battery 110 may provide electrical power for powering and operating the annunciation assembly 208. The annunciation assembly 208 is also configured to annunciate at least any one or more conditions, such as condition (A) and/or condition (B). Condition (A) exists in which once the wire clamp 116 is operatively seated to the battery terminal 112 while the fixture assembly 202 receives a seating force 300. The seating force 300 is large enough so that the wire clamp 116 is forced to operatively seat relative to the battery terminal 112 (and/or to the vehicle battery 110). The definition of "seat" is a place where something is located or based, and/or the surface or part on which another part sits or rests. The seating force 300 is depicted in FIG. 4A. The seating force 300 is a force that has sufficient magnitude and direction to cause an object to become properly seated. Condition (B) exists in which once the wire clamp 116 is not operatively seated to the battery terminal 112. A variation of condition B is once the wire clamp 116 is not operatively seated to the battery terminal 112 while the fixture assembly 202 receives the seating force 300 (if so desired).

Referring to FIG. 2A, in accordance with a specific option, the annunciation assembly 208 has a first conductive contact 280 configured to contact the first battery terminal 118 once positioned to do just so. The annunciation assembly 208 also has a second conductive contact 282 configured to contact the second battery terminal 120 once positioned to do just so. The annunciation assembly 208 also has an annunciator element 288 configured to provide an annunciation indication (visual, audible or both) configured to indicate that the wire clamp 116 is operatively seated to the battery terminal 112. In this manner, while the fixture assembly 202 receives the seating force 300, the clamping force 302 may be operatively applied to the wire clamp 116. By way of example, the annunciator element 288 includes an LED (Light-Emitting Diode), a speaker, etc., and any functional or structural equivalent thereof. The annunciation assembly 208 also has a first wire 284 operatively connecting the first conductive contact 280 to the annunciator element 288. The annunciation assembly 208 also has a second wire 286 operatively connecting the second conductive contact 282 to the annunciator element 288. As a result of the wire clamp 116 becoming operatively seated to the battery terminal 112 while the fixture assembly 202 receives the seating force 300 to do just so. Once the first conductive contact 280 contacts the first battery terminal 118, and once the second conductive contact 282 contacts the second battery terminal 120, the annunciator element 288 provides the annunciation indication. For example, a tri-colored LED may be used, in which a green light may indicate an acceptable status; a red light may indicate an unacceptable status; a yellow light may indicate a marginal status; the status may indicate whether there was or is an adequate amount of the seating force 300 transferred to the wire clamp 116.

In accordance with an option, the apparatus 200 may be configured to prevent application of the clamping force 302 to the wire clamp 116 until the optimal seating of the wire clamp 116 is achieved (for example, by using a poka-yoke assembly). Poka-yoke is a Japanese term that means "mis-take-proofing." A poka-yoke assembly is any mechanism that helps an equipment operator (user) to avoid mistakes. Its purpose is to eliminate product defects by preventing, correcting, or drawing attention to human errors as they occur. It will be appreciated that (in accordance with an option) the apparatus 200 includes a poka-yoke assembly configured to prevent application of the clamping force 302 to the wire clamp 116 until the optimal seating of the wire clamp 116 is achieved. As well, the annunciation assembly 208 may include a sensor (a pressure transducer or a strain gauge sensor) configured to sense the magnitude of the seating force 300 applied to the wire clamp 116. The sensor may be powered without using power from the vehicle battery 110.

In accordance with an option, the force-conveyance assembly 204 defines or provides a recess 244 configured to accommodate or receive, at least in part, the annunciation assembly 208. The force-conveyance assembly 204 supports positioning of the first conductive contact 280 and also supports positioning of the second conductive contact 282 relative to the first battery terminal 118 (as depicted in FIG. 4A) and relative to the second battery terminal 120 (as depicted in FIG. 4B), respectively (once the fixture assembly 202 is positioned relative to the vehicle battery 110 as depicted in FIG. 1B). The force-conveyance assembly 204 may be configured to house the annunciation assembly 208 if so desired, for example, where the apparatus 200 is to be manually manipulated by the user. In this case, the fixture assembly 202 provides a relatively large surface area for the user for improved manual manipulation.

In accordance with a specific embodiment, the fixture assembly 202 includes the annunciation assembly 208 having a built-in electrical circuit with a "terminal is set" lighting feature or indicator (such as, the annunciator element 288) configured to provide a visual and/or audible confirmation (to the operator or user), in which the confirmation indicates that one or more instances of the wire clamp 116 are properly seated (and/or are not properly seated).

As well, a method is provided, and the method may include completing the process in one simultaneous step. The method include applying the seating force 300 to set the wire clamp 116 to the battery terminal 112 prior to application of the clamping force 302 (such as a torquing force) to the wire clamp 116. The apparatus 200 may be configured to force each instance of the wire clamp 116 onto a respective instance of the battery terminal 112 simultaneously to the correct seating location. When the correct seating location is achieved, the annunciation assembly 208 may be activated. Then the operator (user) may apply the clamping force 302 to the wire clamp 116.

Referring to FIG. 2B, in accordance with an option, the fixture assembly 202 includes the seating assembly 206. Generally speaking, the seating assembly 206 is configured to couple to the force-conveyance assembly 204. Optionally, the seating assembly 206 extends from the force-conveyance assembly 204 toward the vehicle battery 110 once positioned to do just so. The seating assembly 206 is further configured to operatively seat the wire clamp 116 relative to (a geometry of) the battery terminal 112 once positioned to do just so. In this manner, in response to the continued conveyance of the seating force 300 (depicted in FIG. 4A) to the wire clamp 116 while a clamping force 302 (depicted in FIG. 4A) is applied to the wire clamp 116, the wire clamp 116 operatively clamps the battery wire structure 114 (depicted in FIG. 4B) to the battery terminal 112, and the wire clamp 116 is operatively seated relative to the battery terminal 112. The bottom of seating assembly 206 contacts the top portion of the wire clamp 116 (and/or of the vehicle battery 110 and/or of the battery terminal 112 as may be required or desired).

In accordance with an option, the seating assembly 206 is further configured to maintain operative seating orientation of the wire clamp 116 relative to (a geometry of) the battery terminal 112 in response to the continued conveyance of the seating force 300 toward the wire clamp 116. The seating assembly 206 may include a control surface or a reference surface.

In accordance with the examples depicted in FIGS. 2B, 4A and 4B, the seating assembly 206 includes a clamp-seating surface 262 configured to contact a top portion of the wire clamp 116 (such as the first wire clamp 122). The seating assembly 206 may further include a battery-seating surface 264 configured to contact a top portion of the vehicle battery 110. The seating assembly 206 may further include a terminal-seating surface 266 configured to contact a top portion of the battery terminal 112. The seating assembly 206 may be further configured to locate and seat the wire clamp 116 to a seat feature of the vehicle battery 110. The use and/or the relative sizes of the clamp-seating surface 262, of the battery-seating surface 264 and of the battery-seating surface 264 may depend on a given geometry and/or location of the vehicle battery 110, of the battery terminal 112, and of the wire clamp 116.

In accordance with an option, the first extension 240 includes an instance of the seating assembly 206 having any one or more instances of the clamp-seating surface 262, the battery-seating surface 264 and the terminal-seating surface 266. The second extension 242 includes an instance of the seating assembly 206 having any one or more instances of the clamp-seating surface 262, the battery-seating surface 264 and the terminal-seating surface 266.

If so required, the second extension 242 may define an access port 246 configured to permit access for a tool to tighten the second wire clamp 124 (depicted in FIG. 4B).

The first extension 240 fixedly supports the first conductive contact 280 for positioning relative to the first battery terminal 118 (as depicted in FIGS. 4A, 4B) once positioned to do just so. The second extension 242 fixedly supports the second conductive contact 282 for positioning relative to second battery terminal 120 (as depicted in FIG. 4B) once positioned to do just so.

FIGS. 3A and 3B depict side perspective views of examples of the apparatus 200 of FIGS. 1A and 1B. FIG. 3A depicts the hidden lines and structure of the fixture assembly 202. The apparatus 200 is placed in abutting relationship to the vehicle battery 110. Specifically, the first extension 240 and the second extension 242 are each configured to abut an outer surface of the vehicle battery 110. In accordance with an option, the force-conveyance assembly 204 is shaped as a handle in order to accommodate the ergonomic needs of a user (for manual manipulation).

FIG. 3B depicts the battery wire structure 114 (also called a wire harness). The first wire clamp 122 is positioned on the first battery terminal 118 (hidden in FIG. 3B but depicted in FIG. 3A). The second wire clamp 124 and the second battery terminal 120 are both hidden from view in FIG. 3B as they are covered by the fixture assembly 202 of the apparatus 200. The seating assembly 206 (hidden in this view but is depicted in FIG. 2B).

FIGS. 4A and 4B depict side perspective views of examples of the apparatus 200 of FIGS. 1A and 1B. Referring to FIG. 4A, the apparatus 200 includes the fixture assembly 202. The fixture assembly 202 is configured to operatively seat the wire clamp 116 (such as the first wire clamp 122) to the battery terminal 112 (such as the first battery terminal 118) of the vehicle battery 110 before and while the wire clamp 116 is attached to the battery wire structure 114. In this manner, the wire clamp 116 remains operatively (fully and properly) seated during installation of the wire clamp 116 to the battery terminal 112. The battery wire structure 114 is not depicted in FIG. 4A but is depicted in FIG. 4B.

In view of the foregoing, a method is provided. The method is for fixedly attaching the battery wire structure 114 to the battery terminal 112 using the wire clamp 116. The method includes (the steps of) operatively seating the wire clamp 116 to the battery terminal 112 of the vehicle battery 110 before and while the wire clamp 116 is attached to the battery wire structure 114 so that the wire clamp 116 remains operatively (fully and properly) seated during installation of the wire clamp 116 to the battery terminal 112.

In view of the foregoing, in general terms, a method is provided, in which the method includes (the step of) operatively conveying, at least in part, the seating force 300 to the wire clamp 116 that is received by the battery terminal 112 in such a way that the wire clamp 116 becomes and remains operatively seated relative to the battery terminal 112 during operative installation of the wire clamp 116 relative to the battery terminal 112.

Referring to FIG. 4A, in accordance with a more specific option, the fixture assembly 202 is configured to operatively convey, at least in part, the seating force 300 to the wire clamp 116 that is received by the battery terminal 112. The fixture assembly 202 is further configured to operatively seat the wire clamp 116 relative to (a geometry of) the battery terminal 112. In this manner, in response to continued conveyance of the seating force 300 to the wire clamp 116 while the clamping force 302 is applied to the wire clamp 116, the wire clamp 116 operatively clamps the battery wire structure 114 to the battery terminal 112, and the wire clamp 116 is operatively seated relative to the battery terminal 112.

In view of the foregoing, a method is provided. The method is for fixedly attaching the battery wire structure 114 to the battery terminal 112 using the wire clamp 116. The wire clamp 116 is configured to be operatively received by the battery terminal 112. The wire clamp 116 is also configured to be operatively coupled to the battery wire structure 114. The method includes (the steps of) operatively conveying, at least in part, the seating force 300 to the wire clamp 116 that is received by the battery terminal 112. The method also includes operatively seating the wire clamp 116 relative to (a geometry of) the battery terminal 112 in such a way that in response to continued conveyance of the seating force 300 to the wire clamp 116 while the clamping force 302 is applied to the wire clamp 116, the wire clamp 116 operatively clamps the battery wire structure 114 to the battery terminal 112, and the wire clamp 116 is operatively seated relative to the battery terminal 112.

In accordance with an option, the force-conveyance assembly 204 is configured to operatively convey, at least in part, the seating force 300 to the wire clamp 116 that is received by the battery terminal 112.

Referring to FIG. 4B, the force-conveyance assembly 204 includes a top portion (or a handle portion) that spans (across) two instances of the battery terminal 112 (such as the first battery terminal 118 and the second battery terminal 120), so that the seating force 300 is applied to each instance of the battery terminal 112.

The force-conveyance assembly 204 is configured to be positioned relative to the wire clamp 116 that is received by the battery terminal 112. The force-conveyance assembly 204 is also configured to operatively convey, at least in part, the seating force 300 to the wire clamp 116. The seating force 300 is configured to operatively seat the wire clamp 116 relative to the battery terminal 112 once the force-conveyance assembly 204 is positioned to do just so.

The force-conveyance assembly 204 may be further configured to receive the seating force 300, and is further configured to convey the seating force 300 to the wire clamp 116 in response to receiving the seating force 300. The force-conveyance assembly 204 may be further configured to cease conveyance of the seating force 300 to the wire clamp 116 in response to removal of the seating force 300 from the force-conveyance assembly 204.

In accordance with an option, the force-conveyance assembly 204 includes the first extension 240 that extends toward the first battery terminal 118. The force-conveyance assembly 204 also includes the second extension 242 that extends toward the second battery terminal 120, and the second extension 242 is set apart from the first extension 240. The force-conveyance assembly 204 is further configured to span at least two instances of the battery terminal 112. The fixture assembly 202 is configured to allow operator application (user application) of the seating force 300 (generally directed toward the vehicle battery 110) to each instance of the wire clamp 116 at the same time (simultaneously). The instances of the wire clamp 116 are installed to respective instances of the battery terminal 112 of the vehicle battery 110.

FIGS. 5, 6A and 6B, 7 and 8 depict perspective views of another example of the apparatus 310, for use on vehicle battery with terminals 312 and 314. In this case, force-conveyance assembly 316 includes a frame portion 318 extending between first and second extensions 320, 322. Extending outwardly from the first extension is a handle portion 324 allowing an operator to grasp and manipulate the device. In this case, the first extension includes an access port shown at 326 in FIGS. 6A and 6B.

As with the earlier examples, the force-conveyance assembly defines or provides a recess 328 configured to accommodate or receive, at least in part, the annunciation assembly, which may include one or more LED's 330, joined by conductor 332. Also provided is a light-transferable cover portion, which is engageable with the frame portion, in the vicinity of the recess. The cover is intended to allow the LEDs to be seen from the exterior of the apparatus, while reducing glare, or excess brightness beyond what is needed for an operator to detect the status so-indicated by them. The extent to which the cover portion is translucent or opaque will be understood by the skilled artisan, taking into account the intensity of the LED's, and will depend on the materials chosen for the cover portion. The cover portion 334 is illustrated, in FIGS. 6A and 6B as matching the shape of the recess 328 to allow for a flush fit. However, it will be understood that the cover portion may be applied to the frame portion in other configurations, including by extending across part or all of a top surface portion along the recess.

In summary, the apparatus 200 is, generally speaking, configured to urge or cause the wire clamp 116 to remain properly seated to the battery terminal 112 as the wire clamp 116 receives the clamping force 302 (such as a torque force) for connecting the wire clamp 116 to the battery terminal 112 and for connecting the battery wire structure 114 to the wire clamp 116. Some aspects of the apparatus 200 may provide the annunciation assembly 208 configured in such a way that once the correct seating of the wire clamp 116 is achieved, the annunciation assembly 208 is activated so that the operator is alerted during seating of the wire clamp 116. Then, the operator receives feedback that the wire clamp 116 may receive the clamping force 302 while the wire clamp 116 is operatively seated (either relative to the battery terminal 112 and/or relative to the vehicle battery 110).

It may be appreciated that the assemblies and modules described above may be connected with each other as may be required to perform desired functions and tasks that are within the scope of persons of skill in the art to make such combinations and permutations without having to describe each and every one of them in explicit terms. There is no particular assembly, components, or software code that is superior to any of the equivalents available to the art. There is no particular mode of practicing the disclosed subject matter that is superior to others, so long as the functions may be performed. It is believed that all the crucial aspects of the disclosed subject matter have been provided in this document. It is understood that the scope of the present invention is limited to the scope provided by the independent claim(s), and it is also understood that the scope of the present invention is not limited to: (i) the dependent claims, (ii) the detailed description of the non-limiting embodiments, (iii) the summary, (iv) the abstract, and/or (v) description provided outside of this document (that is, outside of the instant application as filed, as prosecuted, and/or as granted). It is understood, for the purposes of this document, the phrase "includes" is equivalent to the word "comprising." It is noted that the foregoing has outlined the non-limiting embodiments (examples). The description is made for particular non-limiting embodiments (examples). It is understood that the non-limiting embodiments are merely illustrative as examples.

What is claimed is:

1. An apparatus for use with a vehicle battery having first and second battery terminals and a wire clamp configured to be operatively received by one of the battery terminals, the apparatus comprising:
   a fixture assembly configured to:
      operatively convey, at least in part, a seating force to the wire clamp being received by the battery terminal; and
      operatively seat the wire clamp relative to the battery terminal while the seating force is conveyed to the wire clamp in such a way that the wire clamp becomes and remains operatively seated relative to the battery terminal during operative installation of the wire clamp relative to the battery terminal; and
   an annunciation assembly including an annunciator element in the form of one or more tri-colored LEDs or speakers operatively coupled with an electrical circuit, the electrical circuit including first and second conductive contacts and being responsive to an operative conductive coupling by the first and second conductive contacts with the first and second battery terminals, and configured to audibly or visibly annunciate at least any one of:
      the wire clamp is operatively seated to the battery terminal, by operative conductive coupling of the conductive contact therewith to activate the annunciator, while the fixture assembly receives the seating force to seat the wire clamp; and
      the wire clamp is not operatively seated to the battery terminal, by non-operative conductive coupling by the conductive contact with the battery terminal that results in a failure to activate the annunciator;
      wherein the one or more tri-colored LEDs are configured to annunciate an acceptable status by a green color, an unacceptable status by a red color, and a marginal status by a yellow color.

\* \* \* \* \*